United States Patent [19]

Lee et al.

[11] Patent Number: 4,714,740

[45] Date of Patent: Dec. 22, 1987

[54] LOW COEFFICIENT OF FRICTION NYLON BLEND

[75] Inventors: Michael C. Lee, Troy; Mark A. Golden, Sterling Heights, both of Mich.

[73] Assignee: General Motors Corporation, Detroit, Mich.

[21] Appl. No.: 892,625

[22] Filed: Jul. 14, 1986

Related U.S. Application Data

[62] Division of Ser. No. 812,849, Dec. 23, 1985.

[51] Int. Cl.$^4$ .............................................. C08L 77/06
[52] U.S. Cl. .................................... 525/179; 525/178; 525/183
[58] Field of Search .......................................... 525/179

[56] References Cited

U.S. PATENT DOCUMENTS 3,274,289  9/1966  Murdock et al. .................... 525/167
3,994,814  11/1976  Cairns ................................ 252/12.6

Primary Examiner—Wilbert J. Briggs, Sr.
Assistant Examiner—A. Carrillo
Attorney, Agent, or Firm—Randy W. Tung

[57] ABSTRACT

A thermoplastic polybend of nylon 66 and polymethylmethacrylate having superior friction and wear properties. Alternatively, the polybend composition may contain a third component of polytetrafluoroethylene to further improve its friction and wear properties.

1 Claim, No Drawings

LOW COEFFICIENT OF FRICTION NYLON BLEND

This is a division of application Ser. No. 812,849, filed on Dec. 23, 1985.

FIELD OF THE INVENTION

The present invention generally relates to a thermoplastic blend of nylon 66 and, more particularly, is concerned with a thermoplastic blend of nylon 66, polymethylmethacrylate, and optionally polytetrafluoroethylene. The resulting thermoplastic polyblend has superior friction and wear properties.

BACKGROUND OF THE INVENTION

Nylon 66, a condensation polymerization product of adipic acid and hexamethylene diamine, is a low cost and high performance engineering thermoplastic material. It has been widely used in the automotive industry for its superior mechanical strength, high temperature durability and easy processibility.

In many automotive applications of plastics, superior friction and wear properties of the material are desired, for instance, some applications requiring the use of a low coefficient of friction plastic material because sliding movement between the plastic material and another material is involved. This is the case in applications such as bearings and gears wherein lubricants cannot be used.

Low coefficient of friction plastic materials have been developed by blending a base plastic material with polytetrafluoroethylene (PTFE). Due to the high melting temperature of polytetrafluoroethylene, a polyblend containing polytetrafluoroethylene is often difficult to process. Moreover, the high processing temperature required often results in a molded polyblend part having poor physical properties. Another added drawback of using polytetrafluoroethylene as a friction modifier at higher percentages of a polyblend system is the high cost of the polytetrafluoroethylene material.

It is therefore an object of the present invention to provide a polyblend of nylon 66 having low coefficient of friction values and high wear resistance suitable for use in applications where frictional and wear properties are desired.

It is another object of the present invention to provide a polyblend of nylon 66 having low coefficient of frictions and high wear resistance by blending nylon 66 with a low cost thermoplastic material.

It is a further object of the present invention to provide an injection moldable, low coefficient of friction and high wear resistant polyblend of nylon 66 which can be molded at moderate processing temperatures to produce plastic parts having superior mechanical properties.

SUMMARY OF THE INVENTION

In accordance with a preferred embodiment of the present invention, thermoplastic nylon 66 polyblends having superior friction and wear properties can be formulated. These polyblend compositions can be readily injection molded into articles having low coefficient of friction and high wear resistance.

We have developed unique polyblends of nylon 66 by using another low cost thermoplastic material of polymethylmethacrylate. Since nylon 66 is a semi-crystalline plastic and polymethylmethacrylate (PMMA) is an amorphous plastic, the effect of PMMA in reducing the coefficient of friction of the polyblend material is quite unexpected. Moreover, polymethylmethacrylate is generally neither known nor has been used for its frictonal or wear resistant properties. We have discovered that polymethylmethacrylate when added in a nylon 66 polyblend as a friction modifier is as effective as polytetrafluoroethylene. This is important since polymethylmethacrylate is a widely available thermoplastic material which only costs a fraction of that for polytetrafluoroethylene.

Another novel feature of our invention is that since polymethylmethacrylate has a very low glass transition temperature when compared to the melting temperature of polytetrafluoroethylene, our nylon 66/PMMA polyblend materials can be injection molded into plastic articles at very low processing temperatures. No loss of physical properties due to high molding temperatures has been observed in our nylon 66/PMMA polyblend system in contrast to that frequently seen in nylon 66/polytetrafluoroethylene polyblend systems.

In an alternate embodiment of our invention, we have also included a small percentage of polytetrafluoroethylene material in our nylon 66/PMMA polyblend. This small percentage of polytetrafluoroethylene material, i.e., less than 10 weiqht percent, does not affect the processinq temperatures of our polyblend. This is true in polyblend systems containing up to 40% by weight of polymethylmethacrylate.

DETAILED DESCRIPTION OF THE PREFERRED EMBODIMENT

According to our preferred embodiment, a thermoplastic polyblend composition having superior friction and wear properties can be formulated by blending pellets of nylon 66 and polymethylmethacrylate together. A commercially available nylon 66 material obtained from DuPont under the trade name of Zytel ® 101NC-10 was used. The polymethylmethacrylate material used was also commercially available from Rohm & Haas under the trade name of Plexiglass V-052. The proportions of each component may be varied within the range of from 60-90% nylon 66 and from 40-10% polymethylmethacrylate.

In accordance with an alternate embodiment of the present invention, the foregoing polyblend may further include another thermoplastic material of polytetrafluoroethylene. The proportion of polytetrafluoroethylene used in our three component polyblend system is less than 10%.

These and other features, embodiments and advantages of the present invention will become apparent in the following detailed descriptions.

The nylon 66 material used in the present invention is a condensation polymerization product of adipic acid and hexamethylene diamine. It was obtained from DuPont Co. under the trade name of Zytel ® 101NC-10. It has a bulk density of 1.14 gm/cc and a melting temperature of 265° C. The number average molecular weight of the nylon 66 is 17,000 and the weight average molecular weight is 32,000.

The polymethylmethacrylate material used in the present invention is commercially available from Rohm Haas under the trade name of Plexiglass V-052. It has a bulk density of 1.19 gm/cc and a glass transition temperature of 104° C. The number average molecular weight of the polymethylmethacrylate is 150,000 and the weight average molecular weight is 310,000.

The two plastic materials in their pellet form were first dried in a vacuum oven under a vacuum of 0.133 KPa for 72 hours at 80° C. A series of polyblend compositions having different volume fractions of nylon 66 and polymethylmethacrylate was prepared. In each preparation, a total of 1.5 kilogram of material was used in an injection molding machine to prepare molded plaques. The dimensions of the molded plaques were 203×50×3.2 mm.

The injection molding condition for all the polyblend compositions were 3.0 second fill time, 44.8 MPa fill pressure, 45.8 MPa peak cavity pressure, 283° C. nozzle temperature, and 50° C. mold temperature. In order to obtain an average value of the coefficient of friction on the molded plaques, samples were cut in both perpendicular and parallel directions with respect to the apparent flow directions to the dimensions of 38×50×3.2 mm.

In order to determine the coefficient of friction values of the polyblend compositions, two numerical data points must be obtained. The first one is the normal force, N, applied on the interface between a plastic sample and an opposing steel plate. The opposing steel plate is made of a polished cold-rolled steel. The second numerical number needed is the frictional force, F, defined as the force required to move the steel plate relative to the plastic sample. The coefficient of friction value is defined as the ratio between F and N.

We have designed a new coefficient of friction fixture to accurately measure the normal force N and the frictional force F. The fixture consists of a threaded thumb-screw unit which is pressed against a load-compensated coil spring and a temperature-compensated washer type load transducer. By rotating the thumb-screw unit, this fixture can accurately apply a desired normal force on the interface between the plastic sample and the steel plate. The range of normal force was calibrated between 0 and 4.4 kilograms. The friction force, F, was measured using an Ingstron machine model 1026 with a 227 kilogram load cell. Measurement of coefficient of friction values were conducted using a cyclic mode at a crosshead speed of 508 mm/min.

We have discovered that the coefficient of friction values obtained by our fixture is essentially the same as that obtained on a coefficient of friction measurement device specified by ASTM Standard Procedure D-3028. Our measurements were conducted by testing both the perpendicular and parallel flow directions on a plastic sample. This technique improves the accuracy of the measurements.

We have discovered that a preferred polyblend compositon of nylon 66/polymethylmethacrylate contains approximately 80% nylon 66 and 20% polymethylmethacrylate. The physical properties of this polyblend, i.e., coefficient of friction, tensile strength, heat deflection temperature, and cost are shown in table 1. Note that in table 1 the physical properties of a nylon 66 are also shown for comparison.

TABLE I

|  | Nylon 66 | 80% nylon 66 20% PMMA | 80% nylon 66 10% PMMA 10% PTFE | 80% nylon 66 15% PMMA 5% PTFE |
|---|---|---|---|---|
| Coefficient of Friction (ASTM D-3028) | 0.32 | 0.27 | 0.25 | 0.22 |
| Tensile Strength (MPa ASTM D-638) | 81.3 | 72.3 | 59.2 | 68.2 |
| Heat Deflection Temperature (°C.) ASTM D-648 | 100° C. | 105.0° C. | 100° C. | 96° C. |
| Cost ($/lb) | 2.05 | 1.82 | 2.33 | 2.08 |

In an alternate embodiment of the present invention, a small percentaqe of polytetrafluroethylene was also added to our polyblend system making it a three-component polyblend or a ter-blend. The polytetrafluoroethylene material we have used is commercially available from DuPont Co. under the trade name of Fluorocarbon Micropower DLX-6000. It has a bulk density of 2.15 gm/cc and a melting temperature of 362° C. We have discovered that when a small percentage of this polytetrafluoroethylene was added, for instance 5 or 10%, the coefficient of friction of the polyblend is further reduced and the wear property is further improved. Data on two of our ter-blend compositions each containing 5% and 10% polytetrafluoroethylene are included in table 1. It should be noted that at the small percentage of polytetrafluoroethylene we used, the processing conditions or the injection molding temperatures of the polyblend system are not significantly changed.

While our invention has been described in terms of two preferred embodiments thereof, it is to be appreciated that those skilled in the art will readily apply these teachings to other possible variations of the invention.

The embodiments of the invention in which an exclusive property or privilege is claimed are defined as follows:

1. A thermoplastic polyblend molding composition consisting of an intimate admixture of
   (a) 90 to 60% by weight of total polyblend composition of nylon 66,
   (b) 5 to 40% by weight of total polyblend composition of a thermoplastic additive of polymethylmethacrylate, and
   (c) 5 to 20% by weight of total polyblend composition of a thermoplastic additive of polytetrafluoroethylene, the total of (a) (b) and (c) being equal to 100%, whereby said thermoplastic additives improve the friction and wear properties of said polyblend composition.

* * * * *